United States Patent
Chan et al.

(10) Patent No.: US 11,029,716 B1
(45) Date of Patent: Jun. 8, 2021

(54) PROVIDING LOW POWER CHARGE PUMP FOR INTEGRATED CIRCUIT

(71) Applicant: Silicon Laboratories Inc., Austin, TX (US)

(72) Inventors: Hua Beng Chan, Singapore (SG); Rex Tak Ying Wong, Singapore (SG); Ricky Setiawan, Singapore (SG)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/793,154

(22) Filed: Feb. 18, 2020

(51) Int. Cl.
*G05F 1/575* (2006.01)
*H02M 3/07* (2006.01)

(52) U.S. Cl.
CPC ............ *G05F 1/575* (2013.01); *H02M 3/073* (2013.01)

(58) Field of Classification Search
CPC ..................................................... G05F 1/575
See application file for complete search history.

(56) References Cited

U.S. PATENT DOCUMENTS

| | | | | |
|---|---|---|---|---|
| 8,508,200 | B2* | 8/2013 | Yamamoto | G05F 1/575 323/280 |
| 9,529,374 | B2* | 12/2016 | Enjalbert | G05F 1/575 |
| 2017/0063229 | A1 | 3/2017 | Powell | |
| 2017/0093399 | A1 | 3/2017 | Atkinson et al. | |
| 2019/0339729 | A1 | 11/2019 | Bink et al. | |

OTHER PUBLICATIONS

Wikipedia, "Low-dropout regulator," https://en.wikipedia.org/wiki/Low-dropout_regulator, last updated Dec. 19, 2019, 6 pages total.
U.S. Appl. No. 16/793,142, filed Feb. 18, 2020, 32 pages total.

* cited by examiner

*Primary Examiner* — Hai L Nguyen
(74) *Attorney, Agent, or Firm* — Trop, Pruner & Hu, P.C.

(57) ABSTRACT

In one embodiment, an apparatus includes: an amplifier to compare a reference voltage to a feedback voltage and to output a comparison signal based on the comparison; a loop circuit coupled to the amplifier, where the loop circuit is to receive the comparison signal and provide a regulated voltage to the amplifier as the feedback voltage in a first mode of operation, and in a second mode of operation to provide a predetermined feedback ratio point to the amplifier as the feedback voltage; and an output device coupled to the amplifier. The output device may be configured to receive a supply voltage and the comparison signal and output the regulated voltage at an output node based at least in part on the comparison signal.

14 Claims, 8 Drawing Sheets

PROVIDING LOW POWER CHARGE PUMP FOR INTEGRATED CIRCUIT

BACKGROUND

Modern integrated circuits (ICs) house vast amounts of computing and other processing capabilities. Internal circuitry of such ICs may operate at different voltage levels. Such voltages are provided, at least initially from off-chip sources. In turn, integrated circuits include one or more internal voltage regulators to regulate a supply voltage to required levels. It is a challenge for such regulator circuitry to operate over potentially wide input voltage ranges and output voltage ranges, as flexibility to enable wide operating ranges limits efficiency of the regulators. Such limits can impact performance, power consumption, among other considerations.

SUMMARY OF THE INVENTION

In one aspect, an apparatus includes: an amplifier to compare a reference voltage to a feedback voltage and to output a comparison signal based on the comparison; a loop circuit coupled to the amplifier, where the loop circuit is to receive the comparison signal and provide a regulated voltage to the amplifier as the feedback voltage in a first mode of operation, and in a second mode of operation to provide a predetermined feedback ratio point to the amplifier as the feedback voltage; and an output device coupled to the amplifier. The output device may be configured to receive a supply voltage and the comparison signal and output the regulated voltage at an output node based at least in part on the comparison signal.

In an example, the loop circuit comprises a voltage divider coupled to the output node, where in the second mode of operation, the loop circuit is to provide the predetermined feedback ratio point to the amplifier as the feedback signal from a feedback node coupled between a first resistor and a second resistor of the voltage divider. The loop circuit may further comprise a switch coupled between the output node and the feedback node, where in the first mode of operation the switch is closed to provide the regulated voltage as the feedback voltage.

In an example, the apparatus further comprises: a current source coupled to the amplifier; and a switch coupled to the current source, where in the first mode of operation the switch is enabled to cause the current source to provide a boost current to the amplifier, and in the second mode of operation the switch is disabled to decouple the current source from the amplifier. The apparatus may further include a charge pump to supply a charge pump voltage to the amplifier, the charge pump voltage different than the supply voltage. The loop circuit may be fully closed in the first mode of operation and partially closed in the second mode of operation. The apparatus may further comprise a controller to send a feedback control signal to cause the loop circuit to provide the regulated voltage to the amplifier as the feedback voltage during the first mode of operation. The apparatus may be a voltage regulator to operate during the second mode of operation comprising a snooze operating mode, where the controller is to send the feedback control signal during the first mode of operation comprising a transition from a normal operating mode to the snooze operating mode.

In another aspect, an apparatus comprises: a first low dropout (LDO) regulator to receive a supply voltage and output a first regulated voltage; at least one capacitor coupled between the first LDO regulator and an output node, the at least one capacitor to be charged by the first regulated voltage and to provide a second regulated voltage to the output node; a feedback loop coupled to the at least one capacitor; and an output device coupled to the output node. The feedback loop may comprise: a comparator to receive a reference voltage at a reference voltage node and a feedback voltage at a feedback voltage node and to provide a signal based on comparison of the reference voltage to the feedback voltage; and a clock divider to receive the signal and to cause the at least one capacitor to be coupled to the output node when the feedback voltage is less than the reference voltage. When the supply voltage exceeds the second regulated voltage by at least a threshold level, the output device is to provide the second regulated voltage and the feedback loop is to stop switching.

In an example, the output device comprises a first terminal coupled to the output node, a second terminal to receive the supply voltage and a gate terminal to receive the supply voltage. The feedback loop may further comprise a plurality of diode-connected transistors coupled between the output node and the reference voltage node of the comparator. The feedback loop may further comprise a second capacitor coupled between the output node and the feedback voltage node of the comparator.

In an example, the apparatus further comprises: a first voltage regulator to receive the second regulated voltage and output at least one first additional regulated voltage; and a second voltage regulator to receive the second regulated voltage and output at least one second additional regulated voltage. The first voltage regulator may have a feedback loop to operate with a closed loop configuration in a first mode of operation and a partial closed loop configuration in a second mode of operation.

The first voltage regulator may further include: an amplifier to compare a reference voltage to a feedback voltage and to output a comparison signal based on the comparison; the feedback loop coupled to the amplifier, where the feedback circuit is to receive the comparison signal and provide the at least one first additional regulated voltage to the amplifier as the feedback voltage in the first mode of operation, and in the second mode of operation to provide a predetermined feedback ratio point to the amplifier as the feedback voltage; and an output device coupled to the amplifier, where the output device is to receive the supply voltage and the comparison signal and output the at least one first additional regulated voltage at an output node based at least in part on the comparison signal.

In yet another aspect, an apparatus comprises: an amplifier to compare a reference voltage to a feedback voltage and to output a comparison signal based on the comparison; a loop circuit coupled to the amplifier, and an output device coupled to the amplifier. The loop circuit may include: a voltage divider coupled to an output node, the voltage divider to provide the feedback voltage to the amplifier; a current sensor to sense a current at the output node, the current sensor to provide the sensed current to the amplifier; and a feedback capacitor coupled between the output node and the amplifier. The output device may receive the comparison signal and a supply voltage and output a regulated voltage at the output node based at least in part on the comparison signal.

In an example, the apparatus comprises a capless voltage regulator. The apparatus may further include a level shifter circuit coupled to the output node, where the level shifter circuit is to receive the regulated voltage and output a level shifted voltage. The apparatus may further include: a second output device coupled to the level shifter circuit to receive the level shifted voltage and output a first regulated voltage to a first load circuit; and a third output device coupled to the level shifter circuit to receive the level shifted voltage and output a second regulated voltage to a second load circuit, where the regulated voltage and the first regulated voltage are at a first voltage level and the third regulated voltage is at a second voltage level. The output device may output the regulated voltage in an active mode and in a snooze mode, the second output device may output the first regulated voltage in the snooze mode and the third output device may output the second regulated voltage in the snooze mode.

DETAILED DESCRIPTION

In various embodiments, an integrated circuit having at least one on-chip voltage regulator may be flexibly controlled to cause the voltage regulator to operate with wide input and output voltage ranges. In addition, the voltage regulator circuitry may include multiple independent voltage regulators, which can be controlled to be dynamically enabled and disabled in different modes of operation, to provide one or more regulated voltage levels with differing current capabilities. These multiple output voltage levels may be provided without external capacitor compensation, in some implementations. Still further, embodiments may provide regulated output voltages that are stable for a wide range of load capacitance and load current, while consuming low quiescent current.

Figure 1:
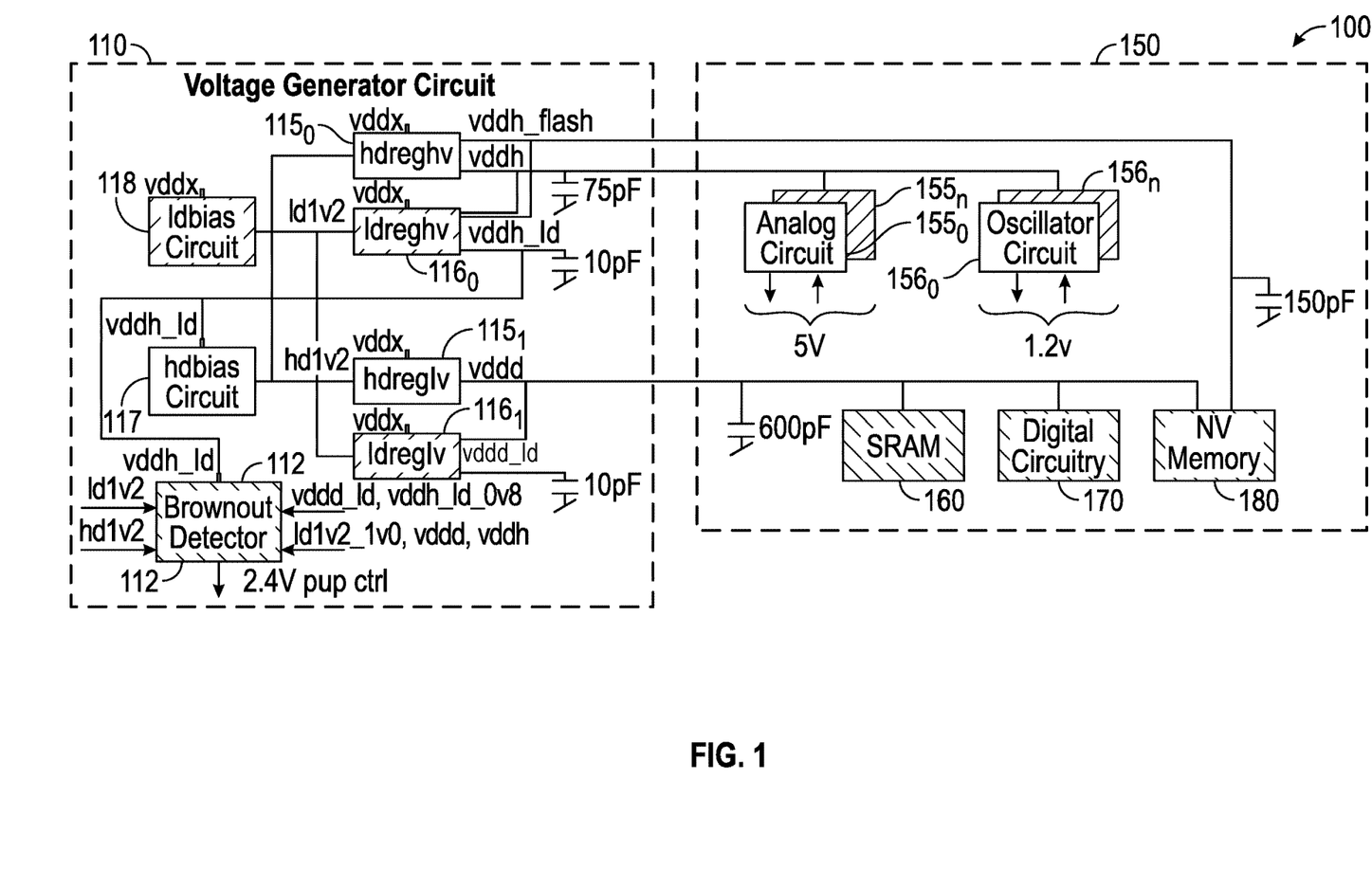
FIG. 1 is a high level block diagram of an integrated circuit in accordance with an embodiment.

Referring now to FIG. 1, shown is a high level block diagram of an integrated circuit (IC) in accordance with an embodiment. As shown in FIG. 1, IC 100 includes a voltage generator circuit 110 (details of which are described further herein) and circuitry 150, which may include the main analog and digital circuitry of IC 100. In the high level of FIG. 1, only a few relevant components within IC 100 are shown. Suffice to say, a given integrated circuit may include a wide variety of different components, ranging from processing circuitry such as processing cores, microcontroller units and so forth, to analog circuitry, memory circuitry, peripheral circuitry, radio frequency (RF) circuitry, and many other types of circuitry. In an embodiment, all circuitry shown in FIG. 1 may be implemented on a single semiconductor die.

In the high level shown, circuitry 150 includes a plurality of analog circuits $155_{0-n}$. As examples, such analog circuits may include analog-to-digital converters, digital-to-analog converters, buffer circuitry, comparison circuitry and so forth. Circuitry 150 is further shown to include oscillator circuitry 1560, which may be used to generate one or more clock signals for use within IC 100. In addition, circuitry 150 further may include various memory devices, including static random access memory (SRAM) 160 and a non-volatile memory 180, which in the embodiment of FIG. 1 is implemented as a flash memory. In addition, circuitry 150 further includes digital circuitry 170 which may include various digital processing circuitry.

With reference to voltage generator circuit 110, different components are provided to enable generation of multiple voltages, both in a high power mode of operation (generally referred to herein as an HD mode) and in a low power mode of operation (generally referred to herein as an LD mode). As seen, voltage generator circuit 110 includes a brownout detector 112. Brownout detector 112 is configured to receive a regulated voltage output by at least one of multiple internal voltage regulators 115, 116 and determine presence of a brownout condition. When such brownout condition is detected, brownout detector 112 may issue a brownout signal, which may cause a reset of IC 100. As further shown, brownout detector 112 further may be configured to output a power control signal when it detects that regulators 115, 116 are outputting an appropriate regulated voltage. Brownout detector 112 may also detect a supply voltage (vddx), LD bandgap reference voltage (LDBIAS) and HD bandgap reference voltage (HDBIAS).

As further shown, voltage generator circuit 110 includes a plurality of voltage regulators 115 and 116. In an embodiment, voltage regulators 115, 116 may be implemented as low dropout (LDO) regulators. More specifically, multiple high power voltage regulators $115_{0,1}$ are provided to generate a plurality of regulated voltages. Understand while voltage regulator $115_0$ is shown as a single block, in various embodiments it may include multiple internal voltage regulators each to generate a corresponding regulated voltage. Such voltage regulators 115 may operate in a high power mode of operation. Note that this high power mode of operation corresponds to normal operation of IC 100 when it is active. This high power mode of operation may be at a level to provide sufficient current to power all active circuitry of IC 100 at normal operating levels. In various embodiments, this high power mode of operation may be at a level to provide current of at least approximately 10 milliamperes (mA) of current capacity.

Instead when operating in a low power mode, e.g., a snooze mode, voltage regulators 115 may be disabled and corresponding low power voltage regulators $116_{0,1}$ may be active to generate corresponding regulated voltages in the low power mode. This snooze mode may be a low power mode in which minimal circuitry is active and only a minimal current level to provide leakage current and sufficient current for the minimally active circuits is provided. In various embodiments, this low power mode of operation may be at a level to provide a maximum current of approximately 1 milliampere (mA) of current capacity.

As further shown in FIG. 1, voltage generator circuit 110 also includes a plurality of bias circuits, namely bias circuits 117, 118, which may generate corresponding bias voltages to be provided to voltage regulators 115, 116.

Those blocks of FIG. 1 shown in cross hatch are active both in low power mode and high power mode, such that these cross-hatched blocks are enabled in snooze mode. Instead blocks not having such cross-hatching are disabled in snooze mode. Thus high power voltage regulators 115 are disabled in snooze mode, along with corresponding bias circuit 117 and other circuitry including at least portions of analog circuits 155 and oscillator circuits 156. Note that regulators $116_{0,1}$ are in an always on domain unless in shutdown mode. A portion of regulator $116_0$ that is driving vddh is powered down during active mode, likewise a portion of regulator $116_1$ that is driving vddd is powered down during active mode. This circuitry of these regulators may be implemented as replica circuitry, and hence can be powered down independently without affecting the always on domain.

In an embodiment, voltage regulators $115_0$, $116_0$ may output a regulated voltage that is at a higher voltage level, e.g., 2.4V. More specifically voltage regulators $115_0$, $116_0$ may output multiple higher voltage levels (vddh and vddh_flash). In some cases these regulated voltages may be at the same high voltage level (e.g., 2.4 volts) or there may be separate regulated voltage levels provided, with a separate regulated voltage provided to non-volatile memory 180. As one particular embodiment, voltage regulator $115_0$ may output vddh at 2.4V (at 6 mA) and output vddh_flash at 3.3V (at 12 mA). Note that flash memory 180 may be powered by both a low voltage level output by regulators $115_1$, $116_1$ and a higher voltage level output by regulators $115_0$, $116_0$, as it is a dual power device. And note that the high voltage is to remain higher than the low voltage, otherwise there will be leakage flowing from the low voltage domain to the high voltage domain.

In an embodiment, voltage regulators $115_1$, $116_1$ may output a regulated voltage that is at a lower voltage level, e.g., 1.2V. Note that the voltage output lines from various regulators 115, 116 may include filter circuitry implemented by corresponding capacitors. While representative values are shown in FIG. 1, in other implementations such filters may have different capacitance levels.

With further reference to FIG. 1, note that the regulated low voltage output level vddd is shared between regulators $115_1$ and $116_1$. In normal operating modes, voltage regulator $115_1$ drives this output voltage. In snooze mode this voltage regulator is powered down and voltage regulator $116_1$ maintains the regulated voltage level using an open loop source follower. Similarly, the regulated high voltage output levels vddh and vddh_flash are shared between regulators $115_0$ and $116_0$. In normal operating modes, voltage regulator $115_0$ drives this output voltage. In snooze mode this voltage regulator is powered down and voltage regulator $116_0$ maintains the regulated voltage levels using an open loop source follower. Understand while shown at this high level in the embodiment of FIG. 1, many variations and alternatives are possible.

Figure 2:
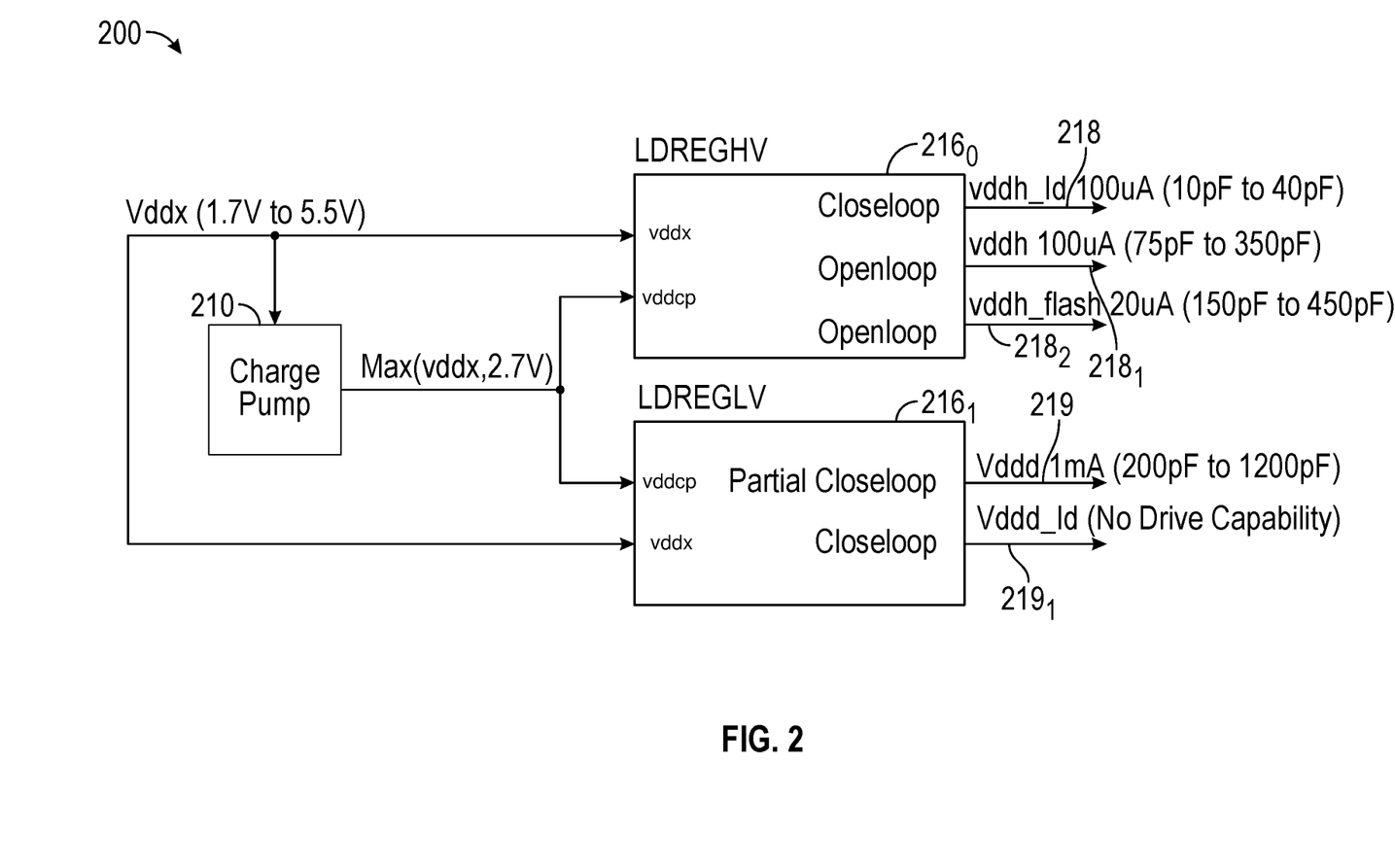
FIG. 2 is a block diagram of a low power voltage regulator in accordance with an embodiment.

Referring now to FIG. 2, shown is a block diagram of a low power voltage regulator in accordance with an embodiment. More specifically as shown in FIG. 2, a voltage regulator circuit 200 includes multiple voltage regulators $216_{0,1}$. Understand that in some implementations one or more of these voltage regulators may include multiple separate voltage regulators. These regulators may correspond to regulators $116_{0,1}$ of FIG. 1.

As further illustrated in FIG. 2, voltage regulators 216 receive a supply voltage (vddx). In embodiments, this supply voltage may vary depending upon a particular system in which voltage regulator circuit 200 is implemented and may further vary, e.g., based on available battery voltage. This supply voltage may vary over a wide operating range (e.g., between approximately 1.7 volts to 5.5 volts) depending on implementation and conditions. Voltage regulators 216 further may be configured to receive a voltage output of a charge pump 210.

As seen, charge pump 210 also receives the supply voltage vddx. In operation, charge pump 210 is configured to maintain and provide an output voltage level that is a maximum one of the supply voltage (and more specifically vddx minus a threshold voltage (Vth) of a power transistor of the charge pump) or a predetermined voltage, which in an embodiment may be 2.7 volts. As such, voltage regulators 216 are configured to receive both the supply voltage and the charge pump voltage output from charge pump 210.

Voltage regulator $216_0$ may be configured to output one or more high voltage levels. More specifically as shown in FIG. 2, voltage regulator $216_0$ may have three different output lines $218_{0-2}$, each to provide a regulated voltage at a given load current level to differently sized loads (representative load capacitances are illustrated in FIG. 2). In an embodiment each output line may output higher voltage levels (e.g., 2.4 volts or more) at different current capabilities. Specifically, via a first output line $218_0$, voltage regulator $216_0$ may output a first high voltage level (vddh_ld, e.g., at 2.4 volts) at a current capacity of 100 microamperes (uA). This voltage level may be used as a supply voltage for various sensitive circuits, including a bias circuit and a brownout detector. In an embodiment, this voltage may be provided to the brownout detector both in active mode and in snooze mode. In turn, via a second output line $218_1$, voltage regulator $216_0$ may output this high voltage level (vddh) at a current capacity of 100 microamperes (uA). This voltage level may be used as a supply voltage for various circuits during a snooze mode, including oscillator circuitry. Finally, via a third output line $218_2$, voltage regulator $216_0$ may output a higher voltage level ((vddh_flash, e.g., at 3.4V) at a current capacity of 20 microamperes (uA). This voltage level may be used as a supply voltage for memory circuitry during a snooze mode, including a flash memory. Note that separate output lines 218 also prevent coupling between the multiple output voltages. And as will be described further herein voltage regulator $216_0$ may output the supply voltage via first output line $218_0$ using a closed loop configuration. In turn, voltage regulator $216_0$ may output the supply voltages via second output line $218_1$ and third output line $218_2$ using an open loop configuration.

Next with reference to voltage regulator $216_1$, it may be configured to output one or more low voltage levels. More specifically as shown in FIG. 2, voltage regulator $216_1$ may have two different output lines $219_{0-1}$, each to provide a regulated voltage at a given load current level to differently sized loads (representative load capacitances are illustrated in FIG. 2). In an embodiment each output line may output lower voltage levels (e.g., 1.2 volts or less) at different current capabilities. Specifically, via a first output line $219_0$, voltage regulator $216_1$ may output a first low voltage level (vddd, e.g., at 1.2 volts) at a current capacity of 1 milliampere (mA). This voltage level may be used as a supply voltage for various circuits, including digital circuitry. In an embodiment, this voltage may be provided during a snooze mode. In turn, via a second output line $219_1$, voltage regulator $216_1$ may output another low voltage level (vddd_ld) with no drive capability, which may be used for brownout detection. And as will be described further herein voltage regulator $216_1$ may output the supply voltage via first output line $219_0$ using a partially closed loop configuration in certain modes of operation (and also using a fully closed loop in other modes). In turn, voltage regulator $216_1$ may output the other low voltage level via second output line $219_1$ using a closed loop configuration.

Figure 3:
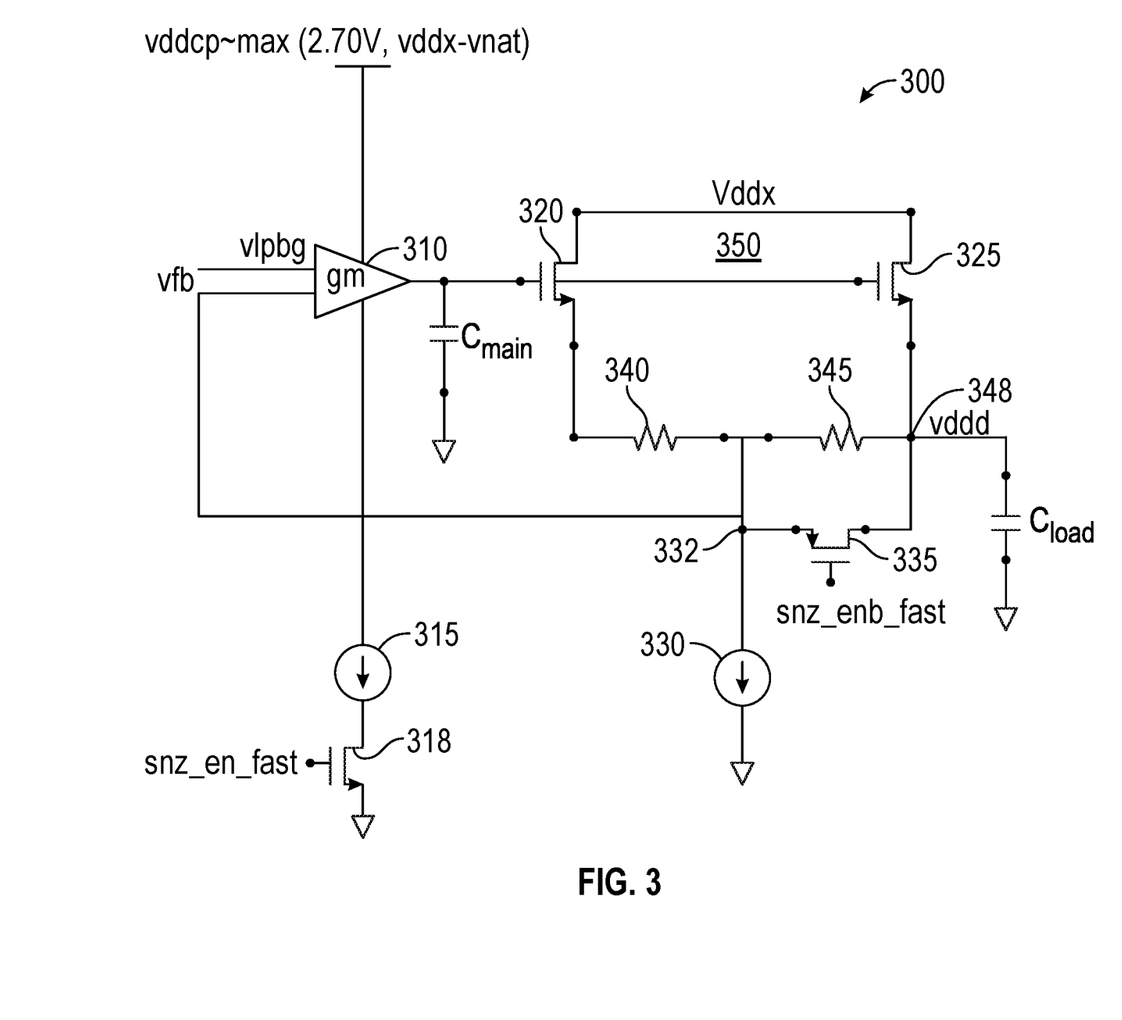
FIG. 3 is a schematic diagram of a voltage regulator in accordance with one embodiment.

Referring now to FIG. 3, shown is a schematic diagram of a voltage regulator in accordance with one embodiment. As shown in FIG. 3, voltage regulator 300 is a low power voltage regulator that is configured to output a regulated low voltage (vddd). This low voltage, in an embodiment, may be approximately 1.2 volts. In an embodiment, regulator 300 may output a 1 milliampere (mA) DC load current with a loading capacitance of between approximately 200 pico-Farads (pF) and 1.2 nano-Farads (nF), represented as a load capacitance (Cload).

As shown in FIG. 3, voltage regulator 300 includes a transconductor 310 configured to receive a reference voltage (vlpbg), which it may receive from a bandgap voltage generator, and a feedback voltage (vfb). In an embodiment, the reference voltage may be set at 1.2 volts. As will be described further herein, depending on mode of operation, one of multiple feedback voltages is received from a loop 350. In a certain mode of operation, loop 350 may be a partially closed loop, while in another mode of operation, loop 350 may be a fully closed loop. With this controllable arrangement of partially closing or fully closing loop 350, smooth transition or handover may occur between low power and high power modes. That is, controlling loop 350 to be partially closed or fully closed in part enables a fast startup of voltage regulator 300, preventing large overshoot (exceeding breakdown) or undershoot (chip reset due to low voltage) when a snooze mode is activated such that voltage regulator 300 can quickly provide a regulated voltage output at sufficient current capacity to handle load demands and allow a high power voltage regulator (not shown in FIG. 3) to be quickly powered down, reducing power consumption.

As shown in FIG. 3, the feedback voltage (vfb) is received from a feedback node 332. As shown, feedback node 332 also is an inter-resistor node that couples between resistors 340 and 345. In an embodiment, resistor 340 may have twice the resistance of resistor 345 (2R to R). As further shown, a current source 330 also couples to feedback node 332.

In addition, a switch, implemented as a p-channel metal oxide semiconductor field effect transistor (PMOS) device 335, couples between an output node 348 and feedback node 332. When voltage regulator 300 is fully powered on in a snooze mode, a control signal (snz_enb_fast) is active to cause PMOS device 335 to turn off, thus enabling the feedback voltage to be the voltage at the inter-resistor node of the voltage divider realized by resistors 340, 345. When fully powered, voltage regulator 300 operates in a partial regulation mode where the feedback voltage is a ratio between the regulated output voltage vddd (at output node 348) and intermediate voltage at a node between resistors 340 and 345). With this partial closed loop, the feedback does not see load capacitance (Cload), which is difficult to compensate for.

This voltage divider thus acts as a current sensing loop to enable the output voltage to be regulated at up to a level of the charge pump voltage, achieving better load regulation. With the above 2:1 ratio between resistors 340 and 345, this feedback voltage is thus ⅓ of the output voltage at output node 348. In this configuration, loop 350 provides the feedback voltage from feedback node 332 to transconductor 310 in this partially closed replica loop operation. This arrangement of the partially closed loop via summing resistors 340, 345 provides a pole-zero pair that helps to maintain phase margin when there is high load capacitance. This summation of internal pole (P1) and output pole (P2) generates a zero before the output pole and thus stability is ensured for a wide range of output capacitance.

Instead when entering snooze mode and voltage regulator 300 is first powered on during a transition from active mode to snooze mode, PMOS device 335 is closed based on an inactive control signal (snz_enb_fast), which causes the regulated output voltage at output node 348 to be provided as the feedback voltage to transconductor 310. With this fully closed loop, a smoother handover between high power and low power modes may be realized, as transconductor 310 operates to regulate to this higher voltage level. Note in this startup condition, both regulator 300 and a high power regulator are on. The reference voltage for the high power regulator may be set to a lower level than the reference voltage for regulator 300, such that regulator 300 will start to take over the load current.

Further to aid in smooth handover, note presence of a current source 315 coupled to transconductor 310. In turn, current source 315 is coupled to a n-channel MOSFET (NMOS) device 318, which has a gate terminal coupled to receive another control signal (snz_en_fast). Note that this control signal is the complementary signal to the control signal provided to PMOS 335. When voltage regulator 300 is first enabled during a transition from active mode to snooze mode and this control signal is active, the additional current of current source 315 is switched into transconductor 310 to allow faster settling.

As voltage regulator 300 becomes fully powered in snooze mode, this control signal may be disabled, effectively disabling current source 315. Transconductor 310 is also coupled to receive the charge pump voltage vddcp. When voltage regulator 300 becomes fully powered, the high power regulator can be turned off without causing large overshoot/undershoot on the regulated output vddd. In an embodiment, the high power regulator may be turned off at the same time when PMOS device 335 and NMOS device 318 are also turned off.

As further illustrated in FIG. 3, voltage regulator 300 includes an output device 325, implemented as an NMOS device. In embodiments, NMOS device 325 may be implemented as a native five volt device or a normal five volt device. Output device 325 acts as a pass device to provide a regulated voltage at output node 348. As shown, NMOS device 325 has a gate terminal coupled to receive the output of transconductor 310, namely a comparison signal that is used to gate NMOS device 325. In turn, NMOS device 325 has a source terminal coupled to output node 348 and a drain terminal coupled to a supply voltage node.

As further illustrated, voltage regulator 300 further includes a replica device 320 In embodiments, replica device 320 may be implemented as another NMOS native five volt device or a normal five volt device. Replica device 320 may be sized smaller than NMOS device 325, e.g., half the size. As shown, replica device 320 has a gate terminal coupled to receive the comparison signal output from transconductor 310. In turn, replica device 320 has a source terminal coupled to resistor 340 and a drain terminal coupled to the supply voltage node. Note that transconductor 310 and NMOS devices 320, 325 potentially receive different supply voltages by way of their coupling to different supply voltages (vddcp and vddx). Also note the presence of a capacitor Cmain coupled to an output of transconductor 310 as a compensation capacitor. While shown at this high level in the embodiment of FIG. 3, many variations and alternatives are possible.

Figure 4:
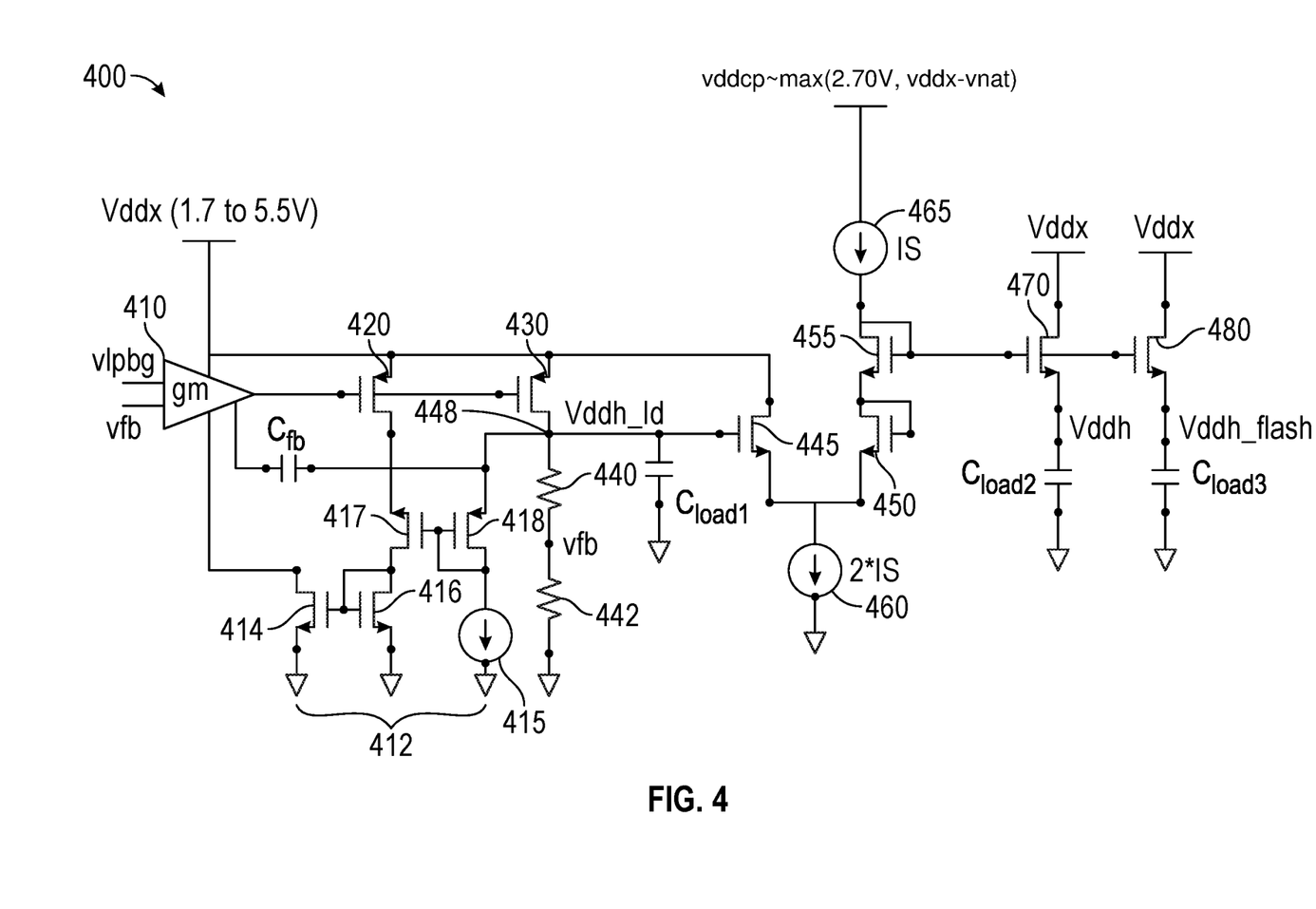
FIG. 4 is a schematic diagram of another voltage regulator in accordance with one embodiment.

Referring now to FIG. 4, shown is a schematic diagram of another voltage regulator in accordance with one embodiment. As shown in FIG. 4, voltage regulator 400 is a low power voltage regulator that is configured to output multiple regulated high voltages (vddh_ld, vddh and vddh_flash). These high voltages, in embodiments, may be between approximately 2.2 volts and 3.2 volts, which can be programmable, e.g., in 50 mv steps, may output load currents of between approximately 20 uA to 100 uA with loading capacitance maximum of approximately 450 pF.

In general, regulator 400 is implemented similarly to regulator 300 of FIG. 3 (note the use of "400" series reference numerals that correspond to "300" series reference numerals of FIG. 3). For ease of discussion, only differences between the regulators are discussed. In this configuration however, a fixed closed loop arrangement is present, with a feedback voltage (vfb) present at an inter-resistor node coupled between resistors 440, 442 of a voltage divider that couples to an output node 448, being coupled to a feedback input node of transconductor 410.

As further shown in FIG. 4, additional feedback paths couple to transconductor 410. In an embodiment, the regulated low power high voltage vddh_ld further may be closed loop compensated via an Ahuja loop. As shown, the Ahuja loop includes a feedback capacitor Cfb and a current sensor 412. Current sensor 412 is implemented using current mirrors and a current source. As shown, current sensor 412 includes a pair of current mirrors formed of NMOS devices 414, 416 and 417, 418 that couple between output node 448 and transconductor 410. More specifically as shown, a drain terminal of NMOS device 414 provides current feedback to transconductor 410. Feedback capacitor Cfb also couples between output node 448 and transconductor 410. Current sensor 412 may provide improved high frequency power supply rejection (PSR). Stated another way, current sensor 412 may provide an adaptive bias to transconductor 410 for fast response when sudden loading is drawn.

As further shown, regulator 400 also provides regulated high voltage supplies for additional circuitry of an IC during a snooze mode. To this end, regulator 400 includes level shifters to provide these additional regulated outputs. As shown, output node 448 is further coupled to a gate terminal of a NMOS device 445. In turn, NMOS device 445 has a drain terminal coupled to receive the supply voltage vddx and a source terminal coupled to a current source 460. This source terminal is also coupled with a source terminal of a diode-connected NMOS device 450. As seen, NMOS device 450 has a drain terminal coupled to a source terminal of another diode-connected NMOS device 455 having a drain terminal coupled to another current source 465 (in turn coupled to the charge pump output voltage (vddcp)). Note that the level shifter circuitry is powered by the charge pump voltage, avoiding a stability problem of large load capacitor and saving bias current consumption. And without a large compensation capacitor, power up of voltage regulator 400 may be realized within a short time duration.

As seen, the co-coupled gate and drain terminals of NMOS device 455 couple to output devices 470, 480, each of which may be implemented as an NMOS device having a drain terminal coupled to supply voltage vddx and a drain terminal to provide the regulated output to respective load circuits $C_{load2}$ and $C_{load3}$. In an embodiment, $C_{load2}$ may include various circuitry of an IC that receives a regulated high voltage. In turn $C_{load3}$ may include certain memory circuitry of the IC such as a flash memory. Note that NMOS devices 445, 450 and 455 may be implemented as 5 volt native level shifters. Note that these regulated outputs are output via an open loop configuration of output devices 470, 480. Understand while shown at this high level in the embodiment of FIG. 4, many variations and alternatives are possible.

Figure 5:
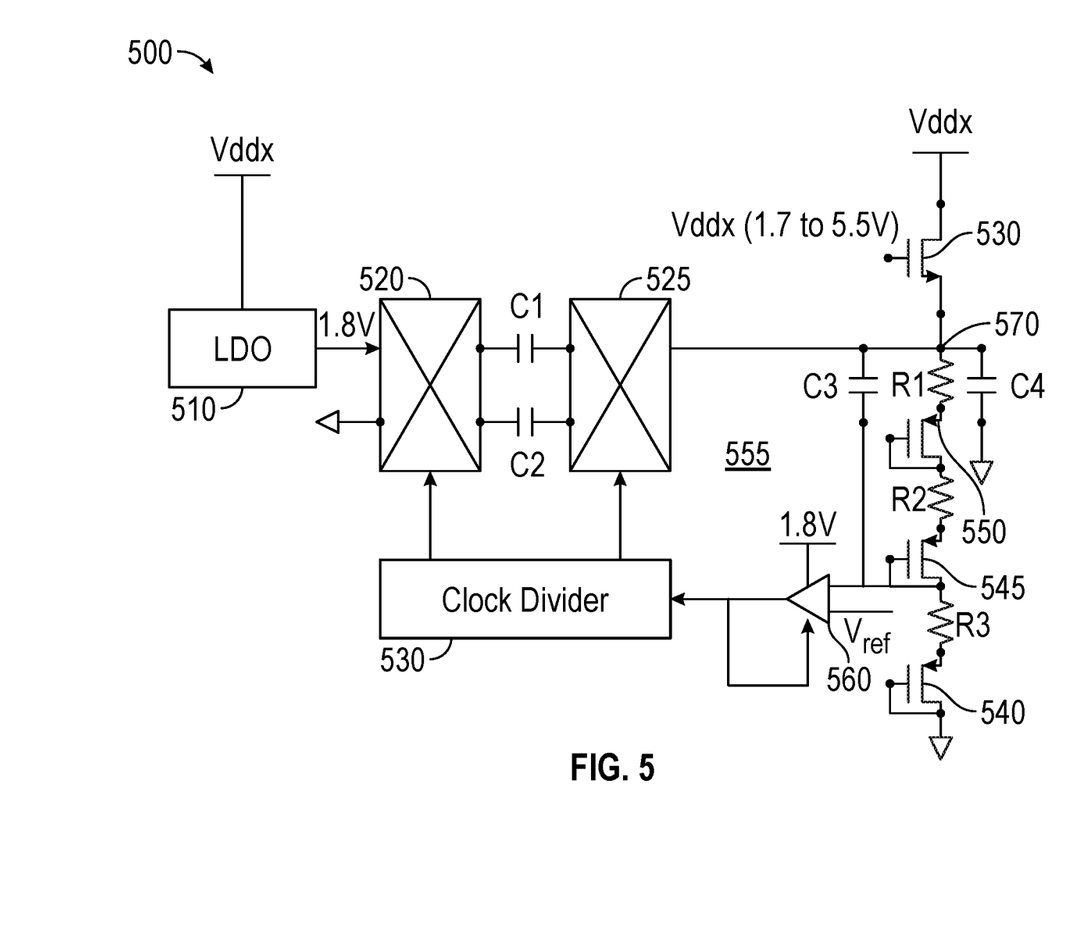
FIG. 5 is a schematic diagram of a charge pump in accordance with an embodiment.

Referring now to FIG. 5, shown is a schematic diagram of a charge pump in accordance with an embodiment. As shown in FIG. 5, a charge pump 500 may be provided to operate at low power levels to provide an input voltage to multiple low power voltage regulators as described herein. In an embodiment, charge pump 500 may correspond to charge pump 210 shown in FIG. 2. As illustrated in FIG. 5, charge pump 500 is coupled to receive a supply voltage in a LDO regulator 510, which provides a regulated voltage, e.g., at 1.8 volts, to a first inverter circuit 520. In an embodiment, first inverter circuit 520 may be implemented with back-to-back inverters that in turn couple to a pair of parallel-connected capacitors C1, C2. In an embodiment, capacitors C1, C2 may be implemented as 0.8 pF capacitors that are coupled between first inverter circuit 520 and a second inverter circuit 525.

In turn, inverter circuits 520, 525 may be controlled by a clock divider 530 which, when enabled, provides clock signals to operate inverter circuits 520, 525. Instead when a feedback loop (generally illustrated at 555) stops switching, clock divider 530 also stops switching, preventing inverter circuits 520, 525 from toggling.

Second inverter circuit 525 when enabled outputs a charge pump output voltage (vddcp) to an output node 570 at a predetermined voltage level, e.g., 2.7 volts. Note that the load requirement of a load circuit, represented by capacitor C4, may be at a relatively low load requirement, e.g., less than approximately 4 uA, e.g., to supply current for a transconductor and a current source of a low power voltage regulator.

Feedback loop 555 includes a plurality of diode-connected transistors 540, 545, 550. As seen, each of these transistors may be implemented as a PMOS device. These transistors are coupled in series via corresponding resistors R1, R2, R3 (which may be equally valued). As shown, the drain terminal of transistor 545 is coupled to a feedback input node of a comparator 560. As shown, comparator 560 further receives a reference voltage level vref (which in an embodiment may be 0.9 volts) via a reference voltage node. When comparator 560 determines that the feedback voltage falls below the reference voltage level, it outputs a pulse signal. This pulse signal enables clock divider 530 and starts to pump up capacitor C4, and thus voltage starts to increase. In this way the output of charge pump 500 can be maintained. A feedback capacitor Cfb couples between output node 570 and the feedback input node of comparator 560.

Note that this condition (when the feedback voltage is greater than the reference voltage) occurs when the voltage at output node 570 exceeds the voltage level output by second inverter circuit 525 (namely 2.7 volts) by a threshold voltage (Vth) of a transistor 530. In an embodiment, transistor 530 may be implemented as a native 5 volt NMOS device. As seen, NMOS device 530 has gate and drain terminals coupled to receive the supply voltage and a source terminal coupled to output node 570. Thus when the supply voltage exceeds this level of 2.7V+Vth, the output voltage at output node 570 is the supply voltage level (less Vth). In this instance, feedback loop 555 may naturally stop switching, reducing power consumption.

With this arrangement, charge pump 500 may operate at very low power levels, while acting to pump up a supply voltage level less than 2.7V to the 2.7V level. Instead, when the supply voltage level exceeds 2.7V+Vth, switching power loss in charge pump 500 is avoided and the output voltage may be provided from the supply voltage via transistor 530. Understand while shown at this high level in the embodiment in FIG. 5, many variations and alternatives are possible.

Figure 6:
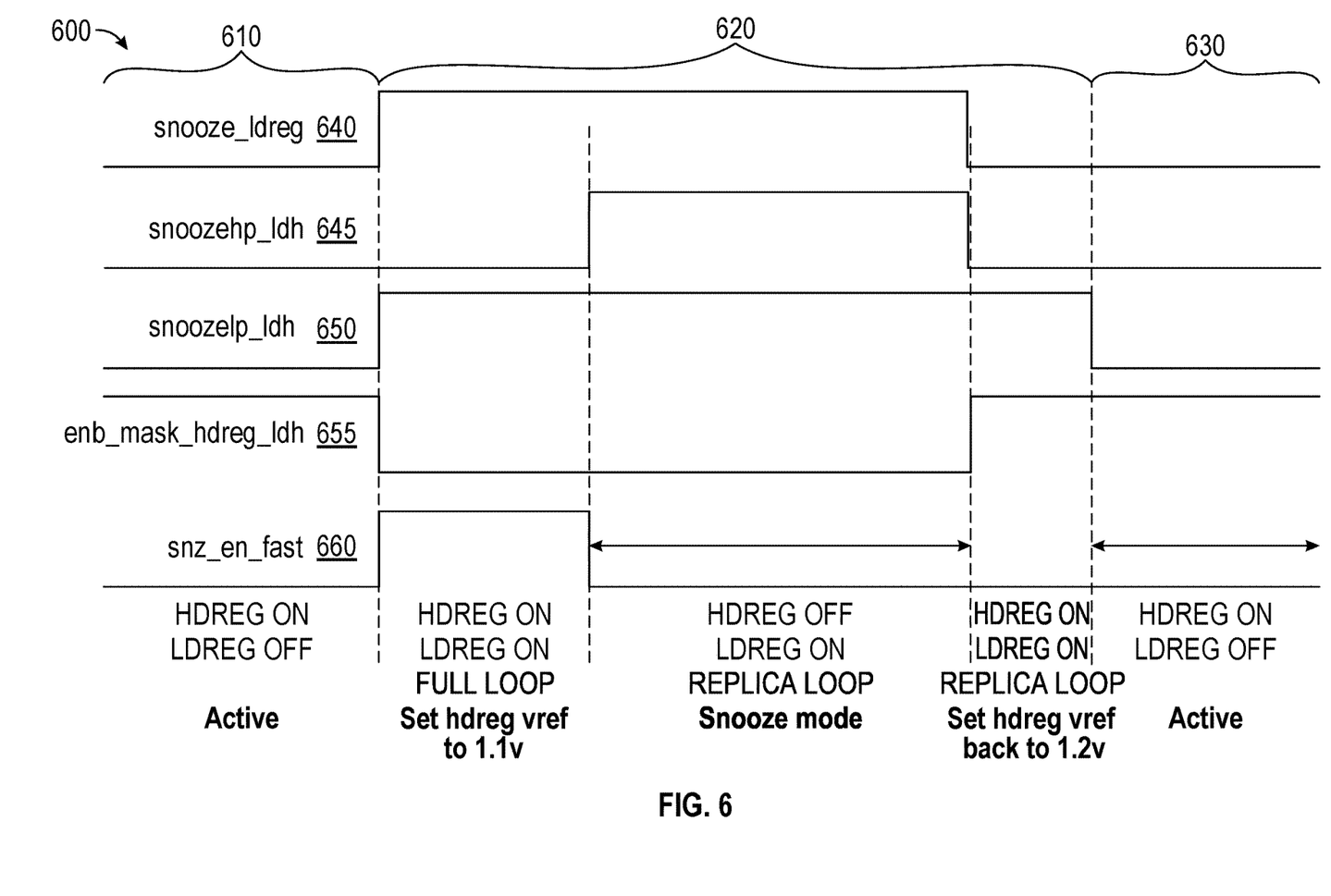
FIG. 6 is a timing diagram illustrating voltage regulator operation in accordance with an embodiment.

Referring now to FIG. 6, shown is a timing diagram illustrating voltage regulator operation in accordance with an embodiment. As shown in FIG. 6, timing diagram 600 illustrates various control signals used to enable smooth transition or handover between low power and high power modes and vice-versa. As illustrated, a time duration shown in FIG. 6 can be broken down into a first time duration 610, a second time duration 620 and a third time duration 630. In first time duration 610 a high power voltage regulator is on and a low power voltage regulator is off. Thus time duration 610 corresponds to an active mode of operation in which circuitry powered by the combined voltage regulators is in an active mode. Instead, in second time duration 620 a snooze mode occurs, including transition durations into and out of this snooze mode. During second time duration 620, the low power voltage regulator is powered on, and the high power voltage regulator transitions to off after an entering transition into the snooze mode and then back on at an exiting transition from the snooze mode. Thereafter, in a third duration 630 the active mode again occurs and the low power voltage regulator is turned off.

In first time duration 610 the low power voltage regulator may be disabled. And the high power voltage regulator is enabled by way of an inactive snooze mode control signal 640 (snooze_ldreg). At a beginning of second time duration 620, which begins with a transition from active mode to snooze mode, snooze mode control signal 640 goes high. Additional control signals 645 and 650 may be provided to digital circuitry as mode status. Also as shown an additional control signal 655 (enb_mask_hdreg_ldh) causes a reference voltage provided to the high power voltage regulator to be reduced, e.g., from 1.2V to 1.1V.

At this same time a current source control signal 660 (snz_en_fast) goes high, causing a current source to provide current to a transconductor of the low power voltage regulator. In addition, a complementary signal to this current source control signal, namely a partial loop control signal (snz_enb_fast, not shown in FIG. 6), causes a fully closed feedback loop configuration of the low power voltage regulator to be active. After a duration as the low power voltage regulator fully powers up (which may be on the order of approximately 90-100 microseconds) these two control signal flip state, causing the feedback loop to go into a partial feedback loop arrangement and disabling the current source. This partial feedback loop configuration is maintained until a next transition from the snooze mode to active mode. Also at this time, the high power voltage regulator may be turned off, effectively ending the smooth entering transition between high power mode and low power mode.

Note that at the end of second time duration 620 as an exiting transition from snooze mode to active mode occurs, the high power voltage regulator is turned on and its reference voltage is set back to 1.2 volts. Also during this time duration a bias circuit that provides bias voltages to the high voltage regulator may be powered up along with additional circuitry of the high power voltage regulator. As time duration 630 begins, the low power voltage regulator may be turned off and the high power voltage regulator is fully active to provide regulated voltage to the active circuitry in this active mode.

Figure 7:
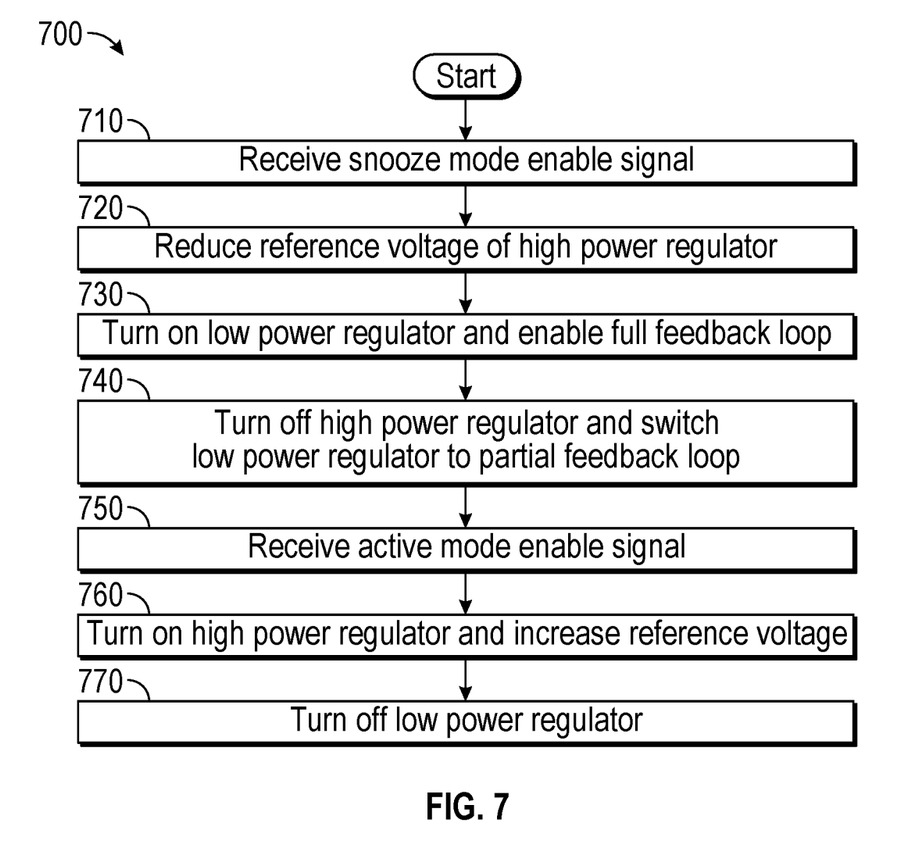
FIG. 7 is a flow diagram of a method in accordance with an embodiment.

Referring now to FIG. 7, shown is a flow diagram of a method in accordance with an embodiment. More specifically, method 700 is a method for controlling one or more low power voltage regulators in accordance with an embodiment. As illustrated, method 700 may be performed by hardware circuitry, firmware, software and/or combinations thereof. In a particular embodiment, method 700 may be performed within circuitry of the voltage regulator in response to control signals received based upon mode of operation as determined by a control circuit, such as an MCU.

Method 700 begins in an active mode of an integrated circuit in which a high power voltage regulator is providing at least one regulated voltage to circuitry of the integrated circuit, such as digital circuitry. During such active mode operation at block 710 a snooze mode enable signal is received. This signal may be received within digital circuitry of the integrated circuit, in an embodiment. In response to this snooze mode enable signal, a reference voltage of the high power voltage regulator may be reduced (block 720). For example, the high power voltage regulator may reduce its reference voltage from a level of 1.2 volts at which it is regulating the output voltage to a lesser reference voltage, e.g., 1.1 volts.

At this same point during the transition from active mode to snooze mode, the low power voltage regulator may be turned on and a full feedback loop of the voltage regulator may be enabled (block 730). With this full feedback loop, the low voltage regulator begins to take over the load current previously provided by the high power voltage regulator.

When this transition portion between active mode and snooze mode is completed such that the low power voltage regulator can fully supply the load current, control next passes to block 740 where the high power voltage regulator may be turned off. In addition at this point, the low power voltage regulator may be switched into a partial feedback loop configuration so that a voltage less than the regulated output voltage is fed back to the low power voltage regulator. At this point, the integrated circuit is in snooze mode in which limited load current is provided by the low power voltage regulator since most or all of the digital circuitry is not active.

Still with reference to FIG. 7 at a later time, an active mode enable signal may be received (block 750). This active signal is thus an indication that the digital circuitry is to again enter into an active mode. As such, the high power voltage regulator may be turned on (block 760). Also at this time, the reference voltage for this high power voltage regulator may be increased back to its predetermined level, e.g., 1.2 volts. During this powering up of the high power voltage regulator, understand that the low power voltage regulator remains on to provide sufficient load current while bias circuitry and the high power voltage regulator are powered up. Finally, at block 770 the active mode may begin, and the low power voltage regulator may be turned off, since the high power voltage regulator can provide sufficient current to the digital circuitry. Understand while shown at this high level in the embodiment of FIG. 7, understand that many variations and alternatives are possible.

Figure 8:
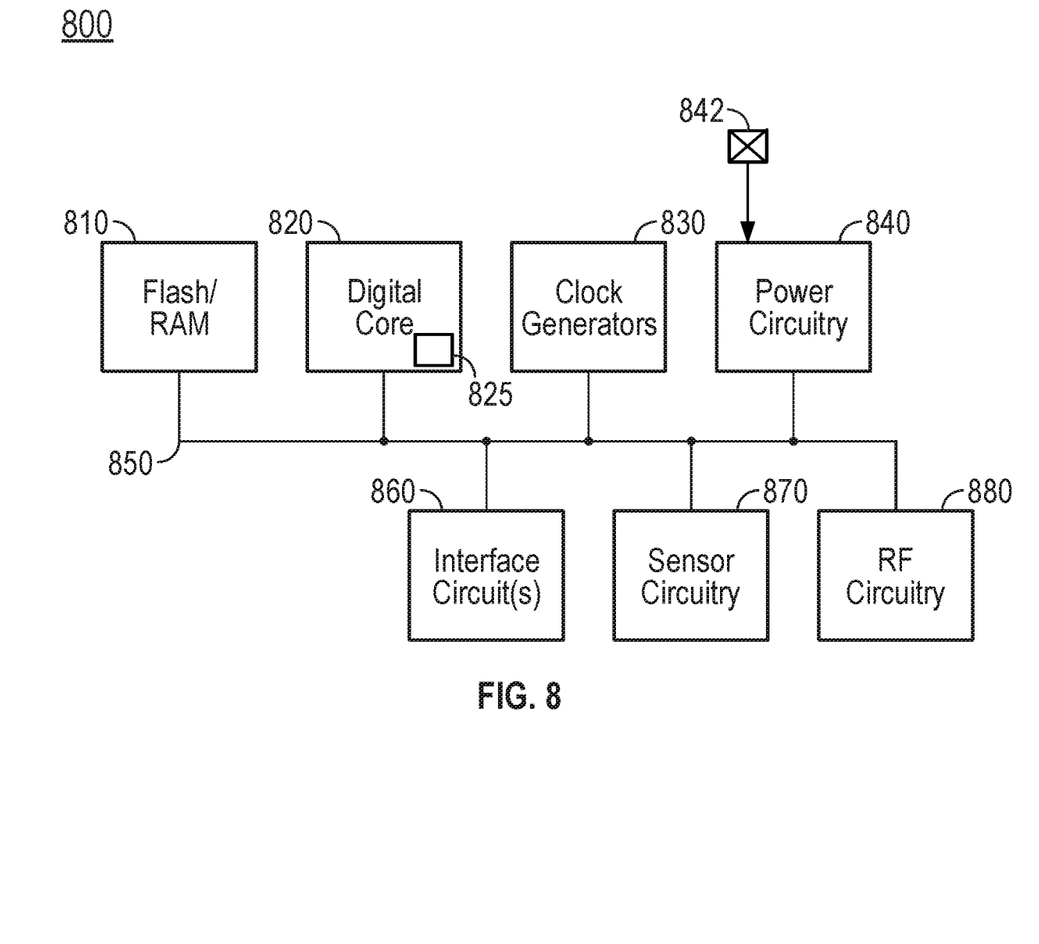
FIG. 8 is a block diagram of a representative integrated circuit in accordance with an embodiment.

Referring now to FIG. 8, shown is a block diagram of a representative integrated circuit 800 which may include a control circuit to control a voltage regulator of IC 800 to switch between high power and low power voltage regulators during mode changes between active and snooze modes of operation, as described herein. In the embodiment shown in FIG. 8, integrated circuit 800 may be, e.g., a microcontroller, wireless transceiver or other device that can be used for a variety of use cases, including sensing, monitoring, embedded applications, communications, applications and so forth. In the embodiment shown, integrated circuit 800 includes a memory system 810 which in an embodiment may include a non-volatile memory such as a flash memory and volatile storage, such as RAM. Memory system 810 couples via a bus 850 to a digital core 820, which may include one or more cores and/or microcontrollers that act as a main processing unit of the integrated circuit. Digital core 820 includes a regulator control circuit 825 which may provide control signals to control operation of voltage regulator circuitry present in a power circuitry 840. Digital core 820 also may couple to clock generators 830 which may provide one or more phase lock loops or other clock generation circuitry to generate various clocks for use by circuitry of the IC.

Power circuitry 840 may include one or more voltage regulators as described herein. As illustrated, at least one power pad 842 may provide a voltage to power circuitry 840, to be a supply voltage to one or more regulators of power circuitry 840. This supply voltage may be at a level below, at or above a level of one or more regulated voltages output by the voltage regulators. One or more of such voltage regulators may include configurable feedback loops as described herein, to provide appropriate feedback voltages during transient operation when transitioning from a snooze mode to an active mode and vice versa.

As further illustrated in FIG. 8, additional circuitry optionally may be present depending on particular implementation to provide various functionality and interaction with external devices. Such circuitry may include interface circuitry 860 which may provide interface with various off-chip devices, sensor circuitry 870 which may include various on-chip sensors including digital and analog sensors to sense desired signals or so forth. In addition as shown in FIG. 8, RF circuitry 880 may be provided which may include analog circuitry of a transceiver to enable transmission and receipt of wireless signals, e.g., according to one or more of a local area or wide area wireless communication scheme, such as Zigbee, Bluetooth, IEEE 802.11, cellular communication or so forth. Understand while shown with this high level view, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an amplifier to compare a reference voltage to a feedback voltage and to output a comparison signal based on the comparison;
a loop circuit coupled to the amplifier, wherein the loop circuit is to receive the comparison signal and provide a regulated voltage to the amplifier as the feedback voltage in a first mode of operation, and in a second mode of operation to provide a predetermined feedback ratio point to the amplifier as the feedback voltage;
the loop circuit comprising an output device coupled to the amplifier, wherein the output device is to receive a supply voltage and the comparison signal and output the regulated voltage at an output node based at least in part on the comparison signal;
a current source coupled to the amplifier; and
a switch coupled to the current source, wherein in the first mode of operation the switch is enabled to cause the current source to provide a boost current to the amplifier, and in the second mode of operation the switch is disabled to decouple the current source from the amplifier.

2. The apparatus of claim 1, wherein the loop circuit comprises a voltage divider coupled to the output node, wherein in the second mode of operation, the loop circuit is to provide the predetermined feedback ratio point to the amplifier as the feedback signal from a feedback node coupled between a first resistor and a second resistor of the voltage divider.

3. The apparatus of claim 2, wherein the loop circuit further comprises a second switch coupled between the output node and the feedback node, wherein in the first mode of operation the second switch is closed to provide the regulated voltage as the feedback voltage.

4. The apparatus of claim 1, further comprising a charge pump to supply a charge pump voltage to the amplifier, the charge pump voltage different than the supply voltage.

5. The apparatus of claim 1, wherein the loop circuit is to be fully closed in the first mode of operation and to be partially closed in the second mode of operation.

6. The apparatus of claim 1, further comprising a controller to send a feedback control signal to cause the loop circuit to provide the regulated voltage to the amplifier as the feedback voltage during the first mode of operation.

7. The apparatus of claim 6, wherein the apparatus comprises a voltage regulator to operate during the second mode of operation comprising a snooze operating mode, wherein the controller is to send the feedback control signal during the first mode of operation comprising a transition from a normal operating mode to the snooze operating mode.

8. An apparatus comprising:
an amplifier to compare a reference voltage to a feedback voltage and to output a comparison signal based on the comparison;
a loop circuit coupled to the amplifier, wherein the loop circuit is to receive the comparison signal and provide a regulated voltage at an output node to the amplifier as the feedback voltage in a first mode of operation, and in a second mode of operation to provide a predetermined feedback ratio point to the amplifier as the feedback voltage;
a current source coupled to the amplifier; and
a switch coupled to the current source, wherein in the first mode of operation the switch is to couple the current source to provide a boost current to the amplifier, and in the second mode of operation the switch is to decouple the current source from the amplifier.

9. The apparatus of claim 8, further comprising an output device coupled to the amplifier, wherein the output device is to receive a supply voltage and the comparison signal and output the regulated voltage at the output node based at least in part on the comparison signal.

10. The apparatus of claim 9, further comprising a replica device coupled to the output device, wherein the replica device is to receive the comparison signal.

11. The apparatus of claim 8, wherein the loop circuit comprises a voltage divider, wherein in the second mode of operation, the loop circuit is to provide the predetermined feedback ratio point to the amplifier as the feedback signal from a feedback node coupled between a first resistor and a second resistor of the voltage divider.

12. A voltage regulator comprising:
an amplifier to compare a reference voltage to a feedback voltage and to output a comparison signal based on the comparison;

a loop circuit coupled to the amplifier, wherein the loop circuit is to:
provide a regulated voltage to the amplifier as the feedback voltage in a first mode of operation;
provide a predetermined feedback ratio point to the amplifier as the feedback voltage in a second mode of operation;
receive a supply voltage and the comparison signal and output the regulated voltage at an output node based at least in part on the comparison signal;
a current source coupled to the amplifier; and
a switch coupled to the current source, wherein in the first mode of operation the switch is to cause the current source to provide a boost current to the amplifier, and in the second mode of operation the switch is to decouple the current source from the amplifier.

13. The voltage regulator of claim 12, wherein the loop circuit comprises a voltage divider coupled to the output node, wherein in the second mode of operation, the loop circuit is to provide the predetermined feedback ratio point to the amplifier as the feedback signal from a feedback node coupled between a first resistor and a second resistor of the voltage divider.

14. The voltage regulator of claim 13, wherein the loop circuit further comprises a second switch coupled between the output node and the feedback node, wherein in the first mode of operation the second switch is closed to provide the regulated voltage to the amplifier as the feedback voltage.

\* \* \* \* \*